United States Patent [19]
Williams et al.

[11] 4,388,976
[45] Jun. 21, 1983

[54] RESILIENT MOUNTING FOR ENGINE ENCLOSURES

[75] Inventors: Hugh K. Williams, Davenport, Iowa; Jerome A. Thies, Geneseo, Ill.

[73] Assignee: Caterpillar Tractor Co., Peoria, Ill.

[21] Appl. No.: 273,895

[22] PCT Filed: Jul. 14, 1980

[86] PCT No.: PCT/US80/00883
§ 371 Date: Oct. 6, 1980
§ 102(e) Date: Oct. 6, 1980

[87] PCT Pub. No.: WO82/00275
PCT Pub. Date: Feb. 4, 1982

[51] Int. Cl.³ .............................................. B62D 25/12
[52] U.S. Cl. .................................................. 180/69 R
[58] Field of Search ............... 180/69 R, 69 C, 89.17, 180/89.18; 296/35.1, 191, 190; 403/224, 408; 296/196, 35.3, 72

[56] References Cited
U.S. PATENT DOCUMENTS

| | | | |
|---|---|---|---|
| 1,945,332 | 1/1934 | Robinson | 104/108 |
| 3,789,945 | 2/1974 | Hansen | 180/69 R |
| 4,046,415 | 9/1977 | Klees et al. | 296/35.1 |
| 4,131,172 | 12/1978 | Wolfgram | 180/69 R |
| 4,143,733 | 3/1979 | Morello | 180/69 R |

*Primary Examiner*—David M. Mitchell
*Attorney, Agent, or Firm*—Phillips, Moore, Weissenberger, Lempio & Majestic

[57] ABSTRACT

It is conventional practice to rigidly secure a hood assembly on an engine enclosure for a construction vehicle. The connection joints are thus subjected to undue bending stresses. This invention solves the above stress problem by attaching one end (24) of a hood assembly (14) on an engine enclosure (11) by a mounting arrangement (23) which permits limited fore and aft and cushioned upward movements of the hood assembly (14) relative to the engine enclosure (11).

1 Claim, 6 Drawing Figures

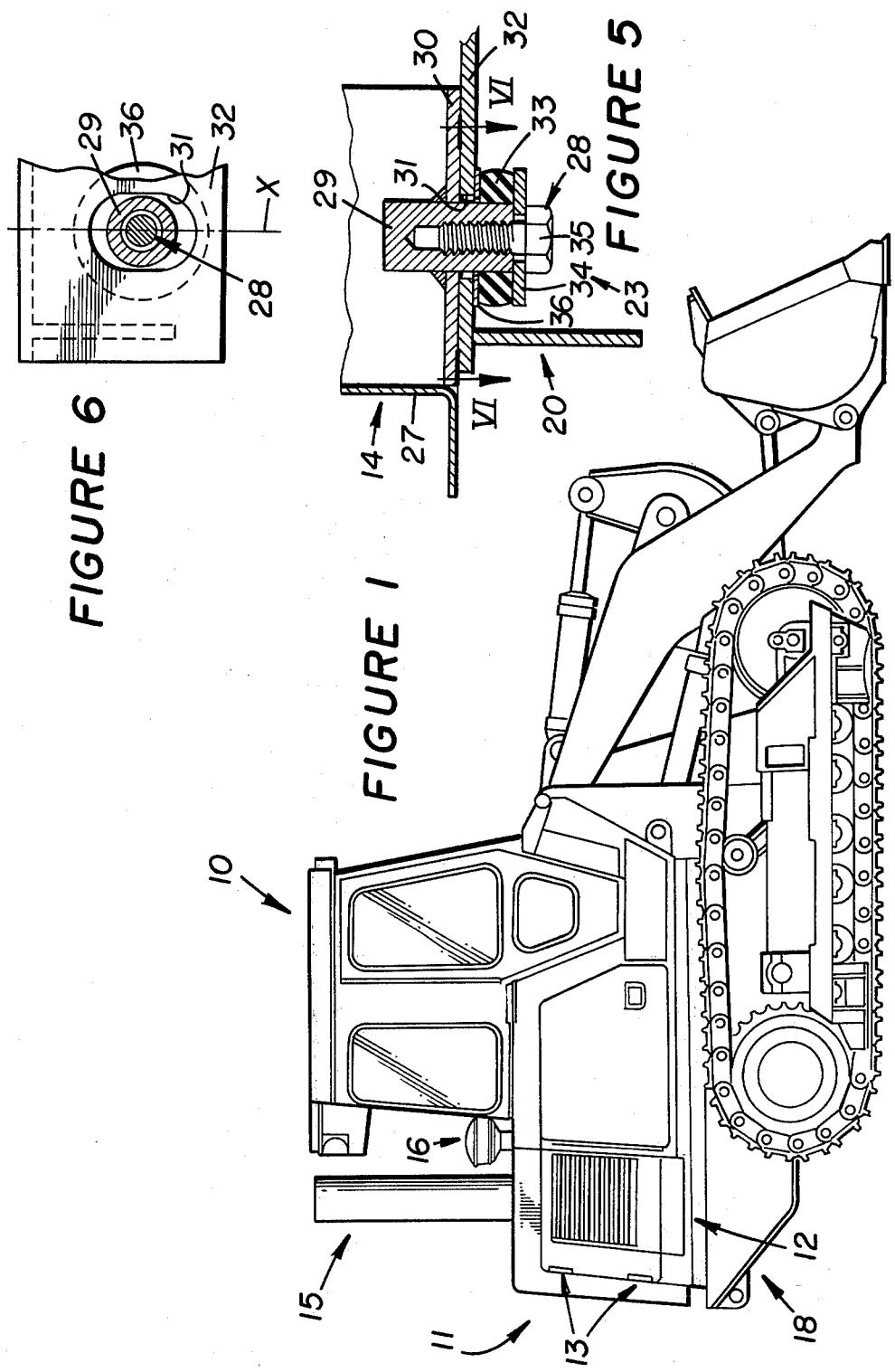

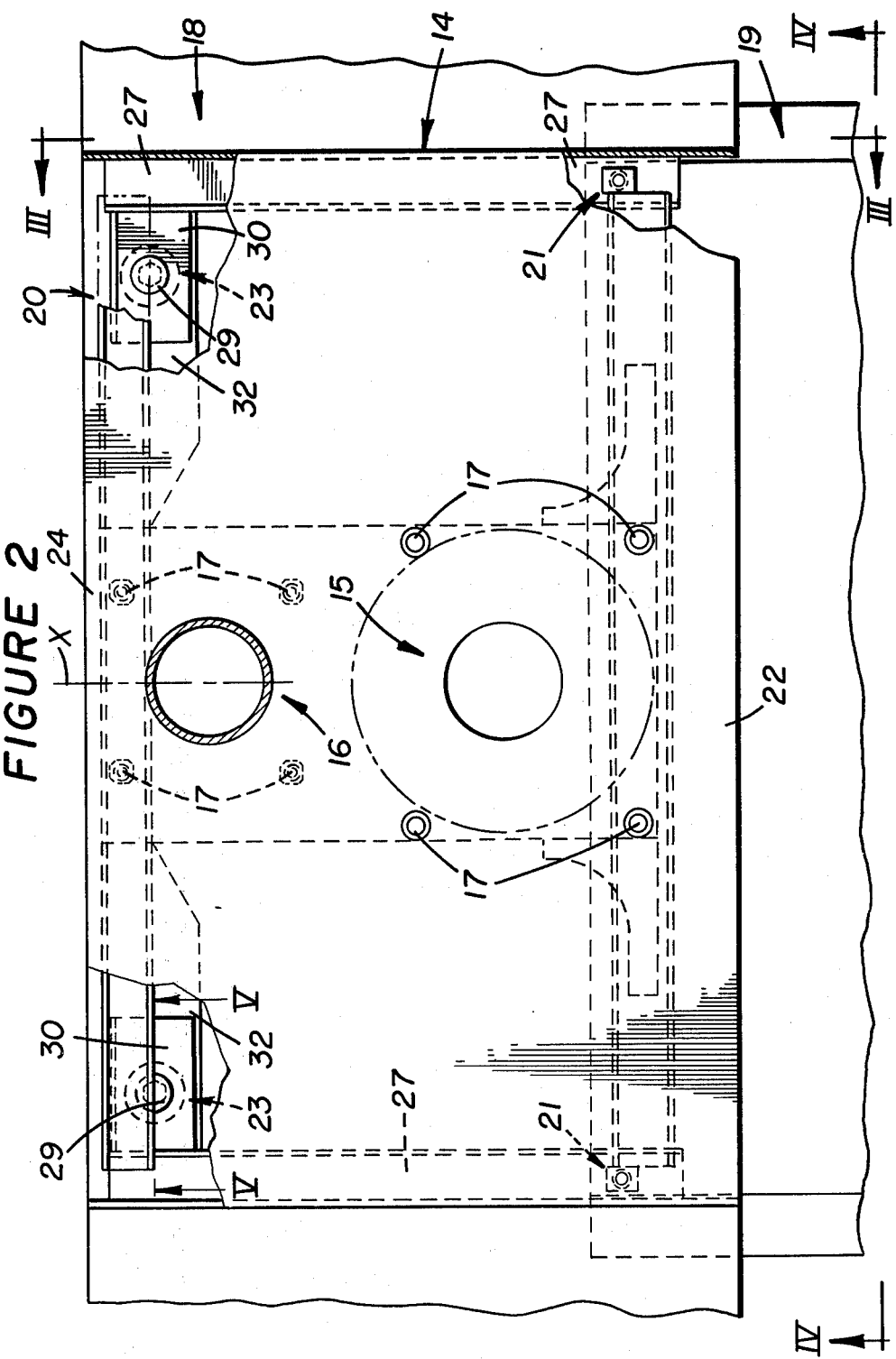

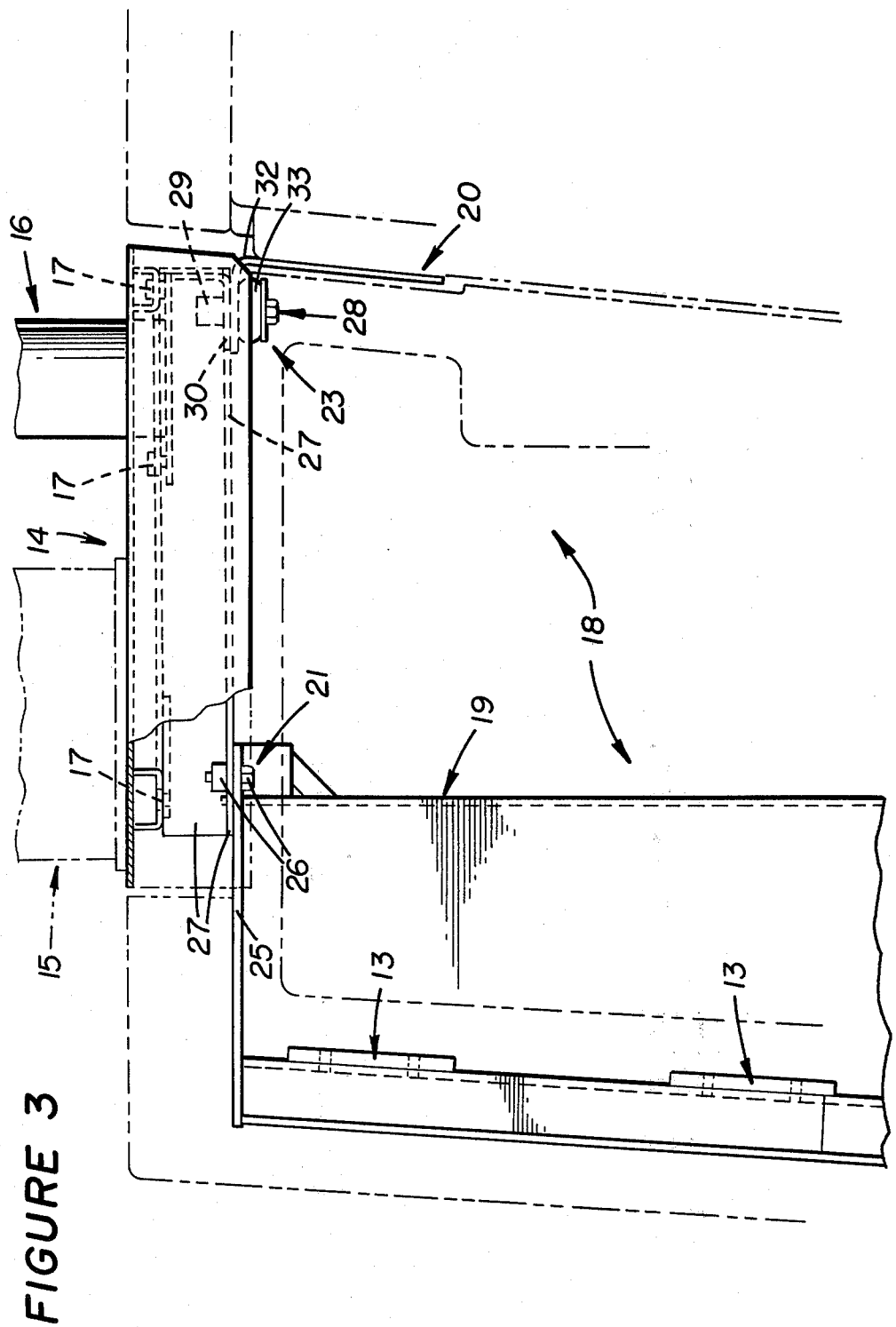

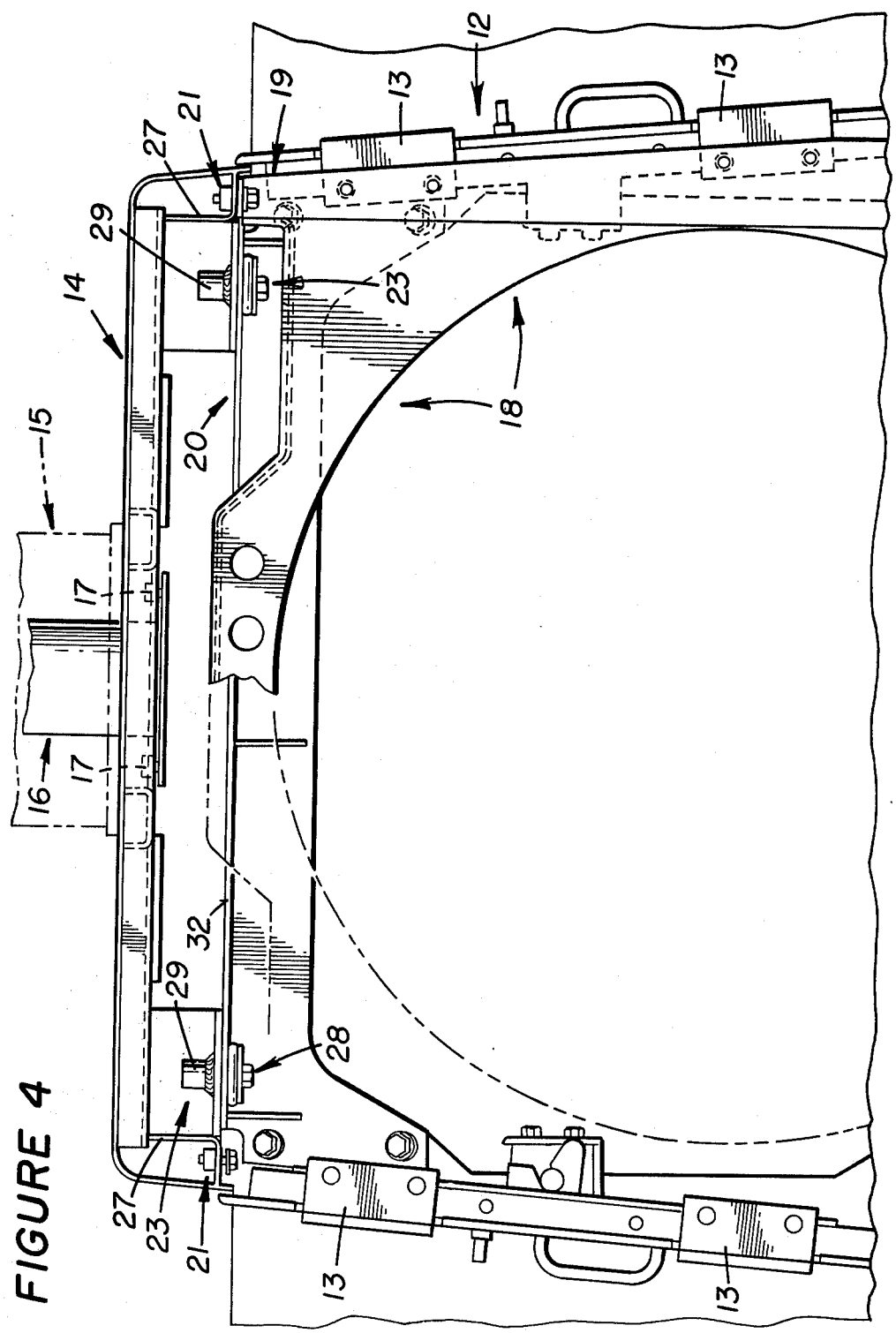

RESILIENT MOUNTING FOR ENGINE ENCLOSURES

DESCRIPTION

1. Technical Field

This invention relates generally to a hood assembly for the engine enclosure of a vehicle and more particularly to a stress-free mounting arrangement for the hood assembly which permits limited fore and aft and cushioned upward movement of a forward end of the hood assembly relative to the enclosure during vehicle operation.

2. Background Art

The hood assembly for the engine enclosure of a construction vehicle, such as a track-type tractor, is rigidly secured in place on the enclosure. A rearward end of the hood assembly is normally bolted directly to a support assembly for a radiator whereas a forward end of the hood assembly is normally bolted to a bracket, integrally secured to a main frame of the vehicle. The hood assembly has a muffler assembly and a pre-cleaner assembly secured thereon which tend to aggravate bending stresses imposed on the hood assembly during operation of the vehicle. Such bending stresses subject the mounting points of the hood assembly to potential damage and failure.

The present invention is directed to overcoming one or more of the problems as set forth above.

DISCLOSURE OF INVENTION

A construction vehicle has a frame, an engine enclosure, a hood assembly mounted on the engine enclosure, and first mounting means for fixedly securing a first end of the hood assembly on the engine enclosure. The improvement therein comprises second mounting means for attaching an opposite, second end of the hood assembly on the engine enclosure to permit limited fore and aft and cushioned upward vertical movement of the second end of the hood assembly relative to the engine enclosure. The second mounting means includes an internally threaded boss secured on the hood assembly, a bolt extending through a structural member of the engine enclosure and threadably secured to the boss, and an elongated slot formed through the structural member. The boss extends through the slot to permit limited fore and aft movement of the hood assembly relative to the structural member of the engine enclosure.

Thus, the weight of the hood assembly, including any pre-cleaner and muffler assembly attached thereon, is fully supported on the structural members of the hood assembly while yet providing a stress-relieved attachment of the second end of the hood assembly to the engine enclosure to prolong the service life of the component parts thereof.

BRIEF DESCRIPTION OF THE DRAWINGS

Other objects and advantages of this invention will become apparent from the following description and accompanying drawings wherein;

FIG. 1 is a side elevational view of a track-type loader embodying the present invention;

FIG. 2 is a top plan and partially sectioned view of a hood assembly mounted on an engine enclosure of the loader;

FIG. 3 is a side elevational view of the hood assembly and engine enclosure, taken in the direction of arrows III—III in FIG. 2 and with portions thereof broken-away for clarification purposes;

FIG. 4 is a rear elevational view of the hood assembly and engine enclosure, taken in the direction of arrows IV—IV in FIG. 2 and with portions thereof broken-away for clarification purposes;

FIG. 5 is an enlarged sectional view, taken in the direction of arrows V—V in FIG. 2, illustrating a resilient fastener employed in a mounting arrangement for the hood assembly; and FIG. 6 is a sectional view, through the fastener, taken in the direction of arrows VI—VI in FIG. 5.

BEST MODE OF CARRYING OUT THE INVENTION

FIG. 1 illustrates a construction vehicle 10 in the form of a track-type loader having an engine enclosure 11 mounted rearwardly on the tractor portion thereof. Access to the interior of the engine enclosure is provided by a standard door assembly 12, hingedly mounted at 13 on the engine enclosure. Referring to FIGS. 2-4, a unitary hood assembly 14 is mounted in covering relationship on engine enclosure 11 and has a muffler assembly 15 and a pre-cleaner assembly 16 secured thereon by bolts or other types of suitable fasteners 17.

As discussed above, it is common practice to fixedly secured hood assembly 14 directly on a frame structure 18 of the vehicle, including a radiator support assembly 19 (the radiator is not shown) and a forwardly disposed subframe assembly 20. As more clearly shown in FIG. 3, radiator support assembly 19 and subframe assembly 20 are spaced longitudinally to have hood assembly 14 secured therebetween. When hood assembly 14 is fixedly secured between assemblies 18 and 19, which is common practice, relative movement will occur between radiator support assembly 19 and subframe assembly 20 to induce bending stresses and flexing in the hood assembly. Thus, the points whereat the hood assembly is fixedly secured to frame structure 18 are subjected to potential damage and failure with this condition being aggravated by the substantial weight and cantilevered disposition of muffler assembly 15 and pre-cleaner assembly 16 on hood assembly 14.

As shown in FIG. 2, this invention overcomes the above stress problem by providing a pair of laterally spaced first mounting means 21 for fixedly securing a first or rearward end 22 of hood assembly 14 on radiator support assembly 19 and second mounting means 23 for attaching an opposite, second end 24 of the hood assembly on subframe assembly 20. As discussed more fully hereinafter, second mounting means 23 will cooperate with first mounting means 21 to permit limited fore and aft movement of second end 24 of hood assembly 14 in the direction of axis X (FIG. 2) and to further permit cushioned upward vertical movement of the second end of the hood assembly relative to the engine enclosure. The term "engine enclosure" as used herein may be considered to comprise the various structures of frame structure 18, including assemblies 19 and 20, which define the engine compartment and the various unnumbered covering panels secured thereon.

As shown in FIGS. 2-4, each first mounting means 21 fixedly secures a structural member 25 of radiatior support assembly 19, such as by a standard nut and bolt 26, to a structural member 27 of hood assembly 14. The nut may take the form of an internally threaded boss, welded or otherwise suitably secured to member 27. Thus, first or rearward end 22 of hood assembly 14 will be fixedly secured in place on radiator support assembly 19 of the engine enclosure to prevent any relative movement therebetween.

Referring to FIGS. 3–6, each second mounting means 23 may comprise a bolt 28 which extends upwardly into threaded engagement with an internally threaded boss 29, welded or otherwise suitably secured to a structural member 30 of hood assembly 14, which is secured to structural member 27 thereof. Boss 29 extends downwardly through an elongated slot 31, defined through a structural member 32 of subframe assembly 20, and has an elastomeric or rubber washer 33 disposed thereon. A first metallic washer 34 is disposed axially between a head 35 of bolt 28 and a lower end of boss 29 and an underside of washer 33, whereas a second metallic washer 36 is disposed between structural member 32 and an upper side of washer 33.

It can thus be seen in FIG. 5 that upward movement of hood assembly 14 relative to subframe assembly 20 will place elastomeric washer 33 in compression to absorb any shock forces imposed thereon. Conversely, downward movement of hood assembly 14 relative to subframe assembly 20 is prevented to, thus, provide a solid and full support for the weight of the hood assembly, including muffler and pre-cleaner assemblies 15 and 16. It should be further noted in FIG. 5 that the pre-load imposed on mounting means 23 may be selectively varied by varying the thickness of metallic washer 36, preferably composed of a hardened steel.

As shown in FIG. 6, elongated slot 31 will permit limited fore and aft movement of boss 29 and thus hood assembly 14 relative to structural member 32 of subframe assembly 20. The pre-load on second mounting means 23 may be adjusted in the manner described above to provide a slip-joint between the hood and subframe assemblies. Excepting minimal forces required to overcome friction between the contacting metallic surfaces of members 30 and 32 and washer 36, the formed slip-joint will tend to settle in an unloaded condition to prevent undue stresses from being imposed on the hood assembly and attendant constructions.

INDUSTRIAL APPLICABILITY

The above-described combined mounting means 21 and 23 find particular application to the attachment of hood assembly 14 on engine enclosure 11 to alleviate bending stresses and the like from being imposed on the hood assembly and associated joints. During operation, first mounting means 21 will ensure that rearward end 22 of hood assembly 14 will be fixedly secured to radiator support assembly 19 to prevent any relative movement therebetween.

However, forward end 24 of the hood assembly will be permitted to undergo limited fore and aft movement in the direction of axis X (FIGS. 2 and 6) and also undergo limited upward vertical movement under the restraint of pre-loaded elastomeric washer 33 (FIG. 5). It should be noted in FIG. 6 that, if so desired, the sides of slots 31 may be relieved relative to boss 29 to permit slight lateral movement of hood assembly 14 relative to structural member 32 of subframe assembly 20. As shown in FIG. 1, access door 12 will provide a workman with ready access to both mounting means 21 and 23 for installation and servicing purposes.

Other aspects, objects, and advantages of this invention can be obtained from a study of the drawings, the disclosure, and the appended claims.

We claim:

1. A construction vehicle (10) having a frame (18), an engine enclosure (11), a hood assembly (14) mounted on said engine enclosure (11), said engine enclosure (11) including a first structural member (32) and said hood assembly (14) including a second structural member (30) mounted in sliding contact directly on said first structural member (32), first mounting means (21) for fixedly securing a first end (22) of said hood assembly (14) on said engine enclosure (11) to prevent relative movement therebetween, and second mounting means (23) for attaching an opposite, second end (24) of said hood assembly (14) on said engine enclosure (11) to permit limited fore and aft and cushioned upward movements of the second end (24) of said hood assembly (14) relative to said engine enclosure (11), said second mounting means (23) including an internally threaded boss (29) secured on said second structural member (30), a bolt (28) extending through said first structural member (32) and threadably secured to said boss (29), and an elongated slot (31) formed though said first structural member (32), said boss (29) extending through said slot (31) to permit limited fore and aft movement of said second structural member (30) relative to said first structural member (32).

* * * * *